Figure 1:
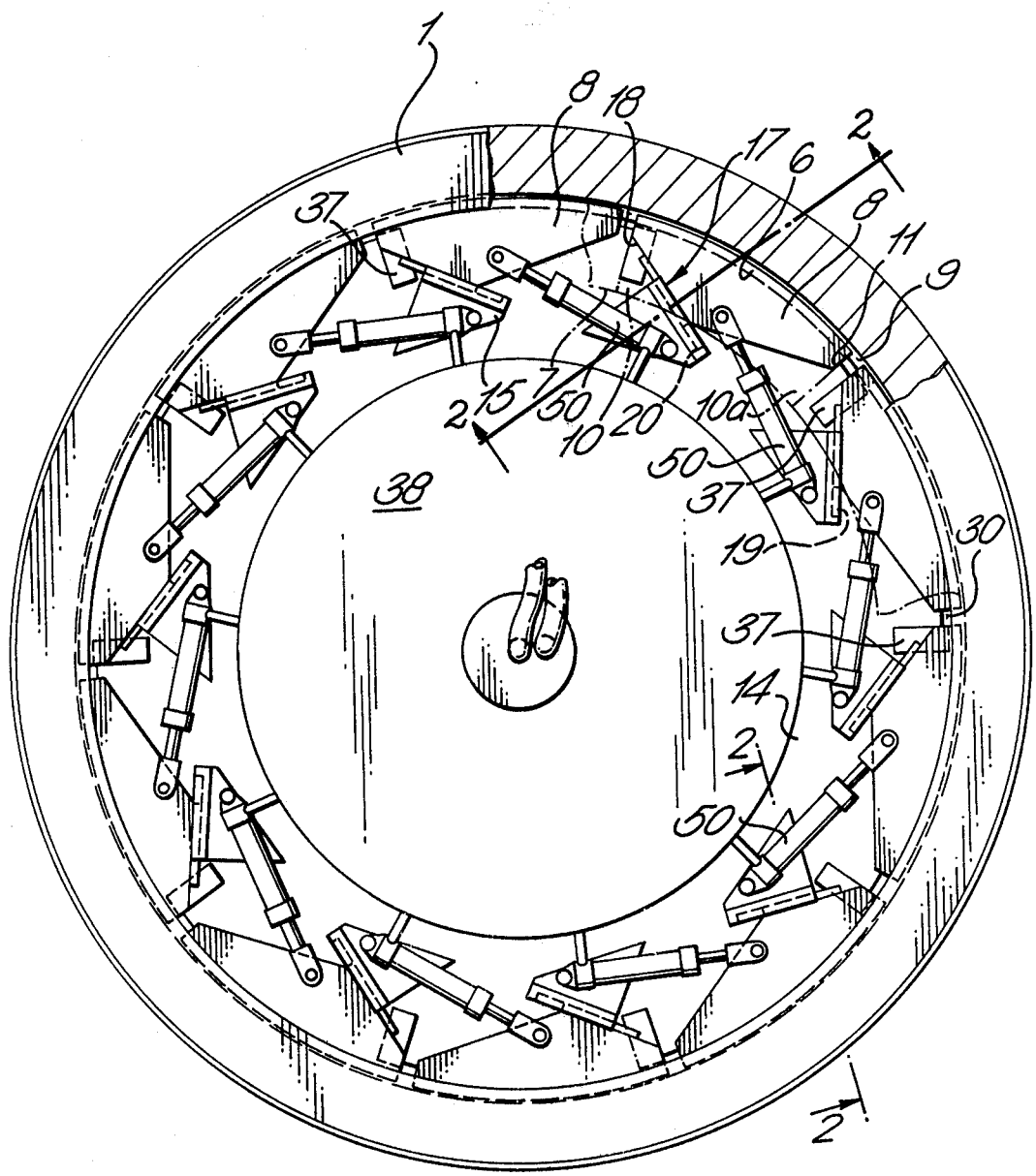

United States Patent [19]

Platts

[11] 4,102,474
[45] Jul. 25, 1978

[54] CLOSURE MEMBER

[75] Inventor: Douglas John Platts, Worksop, England

[73] Assignee: General Descaling Company Limited, England

[21] Appl. No.: 580,983

[22] Filed: May 27, 1975

[30] Foreign Application Priority Data

May 28, 1974 [GB] United Kingdom ............ 23537/74

[51] Int. Cl.² ........................................... B65D 45/28
[52] U.S. Cl. .............................. 220/323; 292/256.65
[58] Field of Search .......... 220/324, 323, 378, 233, 220/234, 235, 237, 238; 292/256.63, 256.65, 256.67, 256.69, 257; 49/465; 217/108

[56] References Cited

U.S. PATENT DOCUMENTS

| | | | |
|---|---|---|---|
| 2,797,948 | 7/1957 | Tangard | 220/378 |
| 2,955,452 | 10/1960 | Myers | 220/323 |
| 3,084,828 | 4/1963 | Davies | 220/323 |
| 3,298,794 | 1/1967 | Mikesell, Sr. et al. | 220/378 |
| 3,481,503 | 12/1969 | Kloess et al. | 220/378 |
| 3,605,337 | 9/1971 | Rodgers | 220/378 |
| 3,667,649 | 6/1972 | Thillet | 220/323 |

FOREIGN PATENT DOCUMENTS

| | | | |
|---|---|---|---|
| 267,294 | 10/1912 | | 220/323 |
| 1,286,971 | 1/1969 | Fed. Rep. of Germany | 220/323 |

Primary Examiner—Stephen Marcus

[57] ABSTRACT

A closure member for a pipe or pressure vessel, comprising a door adapted to fit an aperture in the body of the pipe or pressure vessel, a plurality of blocks slidably mounted adjacent the periphery of the door and movable from a position at least substantially wholly within the said periphery to a position in which a part of each block protrudes beyond the periphery for engagement with the said body, the said parts in the blocks together forming a protrusion extending substantially entirely round the periphery of the door, and means for moving the blocks from the withdrawn to the protruding position.

19 Claims, 5 Drawing Figures

CLOSURE MEMBER

This invention relates to a closure member, especially a closure member for high-pressure vessels or pipes.

One natural way to close the end of a pipe or to give access to a pressure vessel, is to furnish the pipe or pressure vessel with a flange, to which is bolted a blind flange or cover plate, following one of the many conventions.

In larger sizes and for higher pressures the time and effort involved in securing such an assembly is prohibitive for frequent or rapid opening, and so a class of quick-opening "closures" has evolved for such frequent or rapid access duties. One such device is the ring lock closure described in our U.K. Patent Specification No. 1,050,920. In that design the connection between the "door" and the outer body of the pipe or pressure vessel is made by sections of ring in shear between opposed grooves, the rings bending elastically from the contracted inner radius, when the door is "free", to the expanded outer radius when the door is "locked".

Another known design, using a shear element engaging an outer groove, substitutes solid sector pieces for the elastic ring. These sectors are arranged around the door on pivots or slides, the geometry being such that they can be moved outwards to engage the holding groove in the outer body, or freed by moving inwards. One difficulty in this class of design is the restriction on the shape of the pressure-bearing door, imposed by the inward clearance for the moving sectors.

It will be appreciated that the anchored sectors are somewhat analogous to a similar number of expanding bolts, (as in a safe door) although the load bearing area is somewhat more advantageously distributed in the case of the sectors.

There are also threaded forms of closure. In the continuous type, various profiles and starts of thread are used to convert the door into a very large screwed plug. This is efficient in load-bearing metal but the fine clearances and multiple turns on the door present problems of friction and jamming.

The classic case of the interrupted thread is the breech-block of a gun, but the principle can reduce to a series of separate inclined planes or wedges around the assembly, one part of which can make a small angular rotation to bring the male and female elements into a wedging relationship. In the limit the wedge angle can become zero, the opposing lugs are then flat, and only the hit-and-miss principle of freeing and locking is retained. (As such a flat-lug assembly produces no axial force, a mode of sealing must be adopted which does not need actual pressure between mating faces for its leak tightness).

There are various desiderata for closures for large or high pressure vessels, and some of these are as follows:

a. Adequate Bearing Area. The loads to be transferred from door to outer body can be in excess of 20 tons per inch of periphery. Such forces can give rise to high bearing loads, which in conjunction with local stress concentrations and deflections can lead to crushing failures and indentation of one part by another. These problems are counteracted by providing a generous bearing area.

b. Continuity. The load or blowing-out force on the door must be transmitted to the fixed outer body over as much of the periphery as possible, for two basic reasons. Firstly to reduce the specific load per unit length of effective restraint material. (Clearly all the interrupted or hit-and-miss lug and thread types, by definition, more than double the specific loading relative to the entire periphery). Secondly the abrupt changes from very high loadings to virtually zero, repeated around the periphery at the ends of each lug, interrupted thread section or segment, produce undesirable stress concentrations and local deformations.

c. Stability. By definition, the parts which carry the blowing-out forces must be capable of some movement relative to the door. The smaller the locking part in relation to the door the more important it is for looseness and deflection to be reduced as much as possible.

d. Compactness. The door and the outer body are primarily pressure vessel components, and their shapes should be largely dictated by this consideration. The locking mechanism should not dictate shapes to these components which detract from their prime design function, and in particular should be a minimum in the radial dimension.

e. Ease of Movement. The pressure loads are such that large masses of metal are involved. In some designs as mentioned these major components are the ones which have to be moved to lock and unlock. For very high pressure designs it is obviously more convenient if the actual locking components are separate, more-easily-moved items, consistent with other requirements.

f. Safety. Virtually all safety codes, and ordinary safety considerations, require safety devices in the form of Safety Locks which must be removed before the door can be unlocked. These devices may seal bleed ports through the door so that internal pressure must be vented, or at least be made manifest, before the door can be unlocked. There is a vast variety of effective ways in which the "interference" can be arranged. In addition some codes impose a further requirement, that the door should unseal its own main pressure seal by a certain distance, and thus release internal pressure, before the door is fully unlocked and while it is still capable of carrying a pressure load. This is usually achieved by some form of stepped or two-stage geometry in the locking elements, to permit the door to move bodily outwards and so relieve the seal.

While the prior designs of closure have satisfied certain of these criteria, they have not generally met all the desiderata satisfactorily. The present invention provides an improved closure which can be designed to meet several desirable criteria for high-pressure vessel and pipe closures.

According to the invention, we provide a closure member for a pipe or pressure vessel, comprising a door adapted to fit an aperture in the body of the pipe or pressure vessel, a plurality of blocks slidably mounted adjacent the periphery of the door and movable from a position at least substantially wholly within the said periphery to a position in which a part of each block protrudes beyond the periphery for engagement with the said body, the said parts of the blocks together forming a protrusion extending substantially entirely round the periphery of the door, and means for moving the blocks from the withdrawn to the protruding position.

Preferably, the door is circular and each block has a part-circular edge surface which protrudes beyond the door. The edge surface may be ribbed so as to provide a plurality of shear surfaces for engagement with corresponding surfaces in the body.

In a preferred embodiment, the blocks move in unison with a compound movement to engage or disengage the body, an intermediate position of the movement showing partial engagement of the load-transmitting surfaces. Suitably each block is moved by means of a fluid-actuated piston, the pistons being operated from a common source of fluid medium.

The invention also provides a novel sealing system for a closure member of a pipe or pressure vessel. The sealing system comprises an elastomer seal having separately defined surfaces for sealing to the door and to the outer body. The elastomer seal normally remains in the outer body and the sealing system preferably includes a rigid reinforcing member between the door and the outer body and in engagement with the elastomeric seal. The reinforcing member may be movable by means external of the pipe or vessel in order to release the seal of the closure member.

Figure 2:
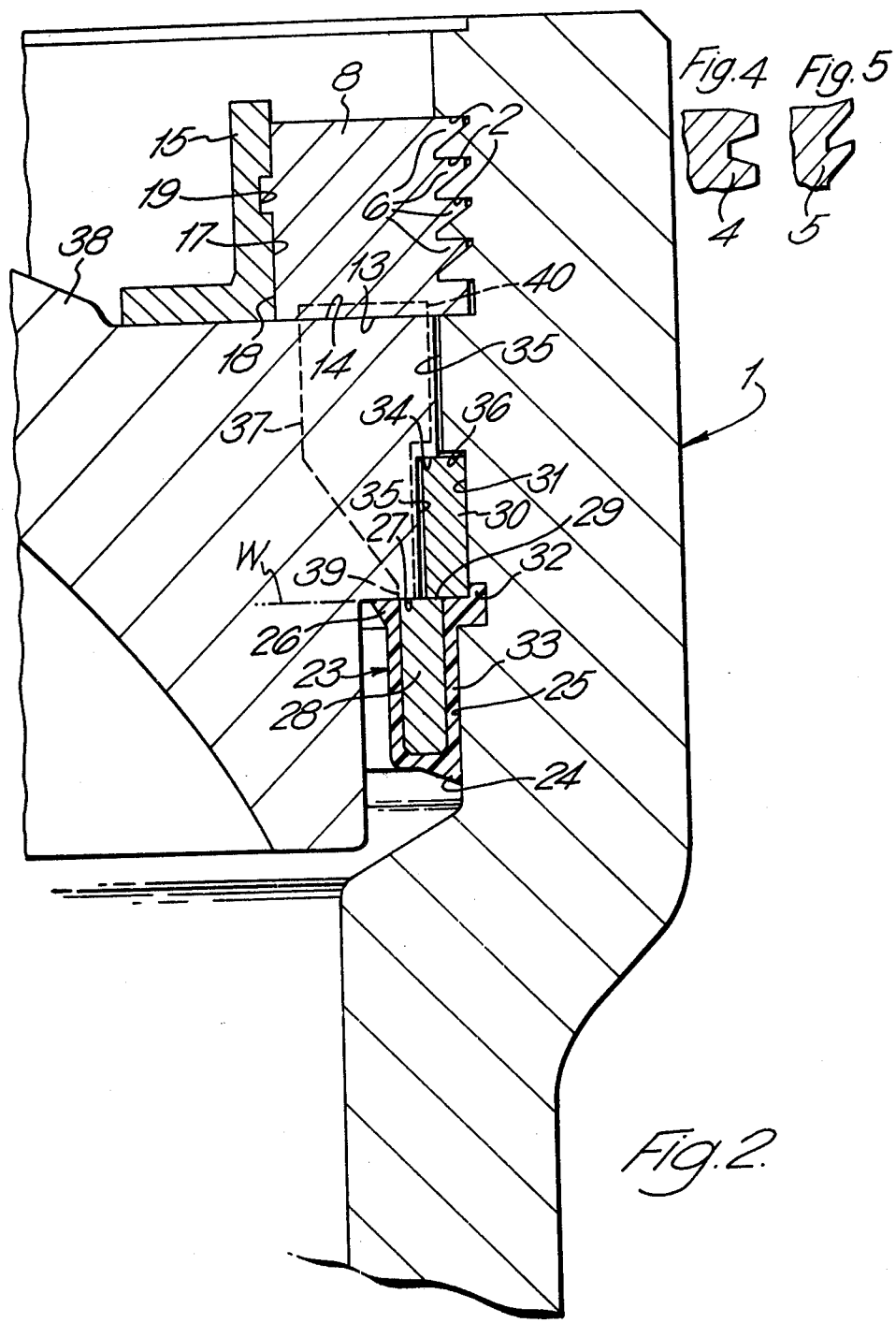
Figure 3:
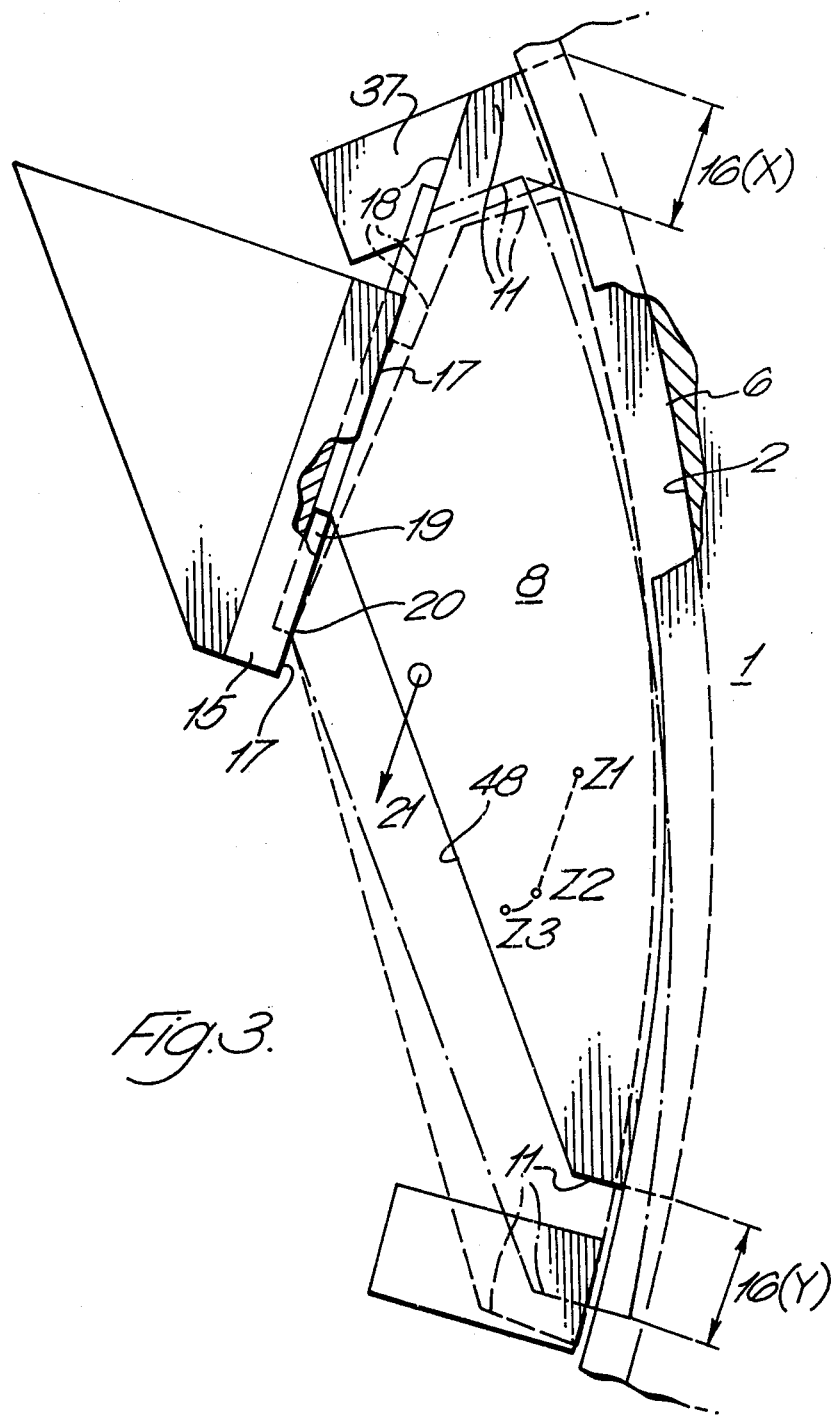

An embodiment of the invention will now be described with reference to the accompanying drawings, in which FIG. 1 is a plan view of a closure member, showing three blocks in detail, the blocks being in the protruded position;

FIG. 2 is a fragmentary vertical sectional view through the closure member taken generally along the line 2—2 of FIG. 1, showing blocks in engagement with an outer body of a pipe or pressure vessel but omitting actuator means for the blocks; and FIG. 3 is an enlarged plan view partly cut away and in section, of one of the blocks, showing various stages in its movement from being fully engaged with the outer body to being fully disengaged therefrom.

FIGS. 4 and 5 are fragmentary vertical sectional views on a reduced scale of modified forms of blocks.

Referring to the drawings, an outer body 1 of a pipe or pressure vessel has an aperture closed by a door 38. Mounted around the periphery of the door 38 is a plurality of blocks 8 which, together, extend almost wholly as a "load ring" 7 (designated by the dot-dash line in FIG. 1) round the periphery of the door and which have load-bearing surfaces engaging with a complementary bearing area in the outer body.

The bearing area in the outer body 1 is sub-divided into a number of steps or grooves 2, each preferably of thread form in cross-section, and preferably of a buttress-thread form able to accept thrust preferentially from one direction. Despite the cross-section resemblance to a female threaded part it will be appreciated that the grooves 2 are separate circumferential entities. They are not helically formed as a continuous thread. The number of thrust faces may be any number from one upwards.

Preferably there are at least three, more preferably there are five, bearing surfaces. The bearing surfaces may be flat, i.e., the surface plane is at right angles to the axis of the door assembly, as in a true buttress-thread, or they may be inclined i.e., the surface plane is not at right angles to the said axis. It will be understood that surfaces inclined as, for example, Acme thread form, as at 4, can be arranged to provide a desirable axially-inward wedging force on the door, when engaged, but also give rise to a radially-outward "bursting" force on the outer body by converting a component of the axial blow-out force to the radial direction. The flat variant is neutral but provides no clamping force on the door, and therefore requires a seal system independent of such forces. For certain duties the faces might be inclined in the other sense, so that when engaged the surfaces are "hooked", as at 5, with the radial component causing even tighter engagement.

The mating bearing surfaces of the blocks 8 which engage the outer body and transmit thereto the blow-out force are provided by corresponding thread-profile ribs 6 formed in the blocks 8 which mate with the female grooves 2 of the outer body.

Conventional clearances and manufacturing techniques are used to ensure an accurate fit between the "load ring" formed by the blocks in combination, and the outer body if assembled together. It will be appreciated that such assembly is impossible with an entire ring, as by definition the rib and groove sets correspond and they are not helically formed to assemble by screwing together. The notional "load ring" 7 is therefore separated into a number of blocks 8 by radial cuts 9; in one embodiment (which is 36 inches nominal) the ring is divided into 10 blocks which are each thus about 11 inches long. This order of length is the preferred proportion, and larger and smaller closures will make use of more and fewer blocks respectively to maintain this general block size, which is not, however, obligatory. The basic load ring is of comparatively narrow radial dimension. Each block 8 can therefore be described as a fairly slender arc with an outer convex face grooved in the manner already described. The inner face of the block 8 is not arcuate and parallel with the outer face, but is cut away at the ends of the block (the cut-away portions are designated 10 and 10a) to reduce still further the radial thickness of the block in these regions 11, where only sufficient material is left adequately to reinforce the "thread" profiles. In plan the block thus approximates to a double-ended wedge, curved of course by the basic arcuate outer edge of the block. The wedge faces, 18, 48, are not however symmetrical, for reasons to be discussed later.

Care must be taken that the area of plane abutment surface 13 on the base of each block is adequate in bearing area for the load, i.e., the reductions in radial dimension at the ends as already described must not adversely affect this parameter. For example, each block may have to accept from the door a force in excess of 200 tons, and transmit this into the groove system and so by shear into the outer body.

It will be seen from the above that the blocks 8 may be fabricated from a solid ring equal in size to the notional "load ring" 7, by forming a series of peirpheral grooves, effecting a series of equi-spaced cuts 9, and cutting away the portions 10 and 10a. It will be understood however that the blocks need not be fabricated in this manner, but can be made, for example, as individual pieces in a variety of ways. It is convenient to make them from a ring in the way described, however, and this lends itself to description and accords with the basic design philosophy.

It can be seen that this design of block, having a number of parallel bearing surfaces provided by the ribs 6 engaging with the outer body 1, provides for an adequate bearing area for the closure.

It will be seen that the individual blocks 8 can be assembled into the outer body one at a time, to form a nearly complete "ring". Because of the shape already described, the circumferential clearances between adjacent blocks required for assembly are small, and the continuity of the "ring" is good. When assembled, the flat face 13, which was the bottom of the original "load ring", now forms an inwardly projecting abutment from the outer body, against which a door could be abutted and by which the blow-out force on the door could be transmitted via the engaged grooves to the outer body.

The door is provided with a plane surface 14, at right angles to its axis, around its outer edge and extending inwardly thereof. The radial width of the thrust face formed by this surface 14 is arranged to correspond approximately with that of the blocks 8, and it is this face which bears against the assembled ring of blocks. Within a limited area each block (when unloaded) is slidably movable on the thrust face, so that with the door in the closed position the blocks may be slid out to engage the outer body and so become a load bearing structure.

It will be appreciated that the individual blocks would be unstable if the above was the limit of their engagement with the door and the outer body. Firstly, a variety of forces, gravity, vibration etc. might tend to move them out of engagement, with damaging results. Secondly, the deflections which must occur in such heavily loaded parts could give rise to forces on the blocks stemming from the pressure loads themselves. If the mating groove faces are in fact inclined as at 4, such forces on the blocks are indeed inherent in the actual design.

It is undesirable for the activating means to be made capable of resisting such forces, which are better absorbed in massive structures of minimum complexity. For this reason the blocks, when moved across the door thrust face to engage the outer body, do not travel in a simple radial path. This movement has other attributes, to be discussed below, but for purposes of stability, the movement (shown in detail in FIG. 3) may be considered as being in a straight line path 16 lying between the radial and tangential, the movement being typically 45° inclined from the radial, although other angles may be used.

An inner abutment surface 17 provided on a backing plate 15 on the door adjacent to each block, the plane of this surface being perpendicular to the thrust face 14 and, in plan, inclined at an angle to the radial substantially agreeing with the direction of travel of the block. One of the inner wedge faces 18 of the block co-operates with this abutment surface 17 which effectively guides the block as the two faces slide past each other.

As each block moves outward (anticlockwise as viewed in FIGS. 1 and 3) from its retracted position lying wholly in contact with face 14 and along its angled path 16, it is being forced into a converging wedge situation, as "seen" by the block, bounded on the outside by the grooved inner surface of the outer body, and on the inside by the inner abutment face 17. As each block comes to rest with the grooves fully engaged it is therefore firmly wedged between outer body and door. It can not move radially inwards to tilt, and is constrained to transmit the blowing out force from the door to the outer body as if it were an integral part of the former.

It will be appreciated from FIG. 1 that as all the blocks move simultaneously the effect is as if a grooved plug had in its entirety expanded, with a slight "rotary" component, to engage the outer body. On withdrawal, each block is brought out of wedging engagement into a fully clear position with the least possible total movement, in the minimum radial dimension and with a well-defined intermediate position giving partial engagement.

The block movement is not therefore linear throughout its path, as will now be described with reference to FIG. 3. The full line represents the fully engaged position of the block, the broken line the fully disengaged position thereof, and the dot-dash line the partially engaged-intermediate position.

Considering the withdrawal motion or "unlocking", each block is pulled back along the line 16 parallel with its corresponding inner abutment face 17 as already defined.

Each block extends over a significant arc of the periphery of the assembly, and it is obvious that a straight-line movement 16 (X) which at one end of the block is seen as making a certain angle with the tangent at that point will at the other end 16 (Y) be moving, relative to the tangent at that end, at a different angle, different in fact by the angle subtended by the block on the periphery.

In practical terms, this means that, whereas the "wedged" or "head" end (X) of each block is sliding backwards out of engagement with the outer grooves, at the other end (Y) of the same block the relative movement between the male and female grooves is more nearly parallel, with little inward radial component of separation. This geometric fact is exploited for another purpose, as will be described; in the meantime it is necessary to describe how the blocks are made to come fully out of engagement. (In certain proportions of diameter and angle a simple movement as so far described could in fact never free the "tail" (Y) of the block from engagement).

The mating surfaces of blocks 8 and inner abutment faces 17 may be provided with supplementary features such as mating grooves 19 and/or lugs and keyways still further to stabilise the blocks.

At this point therefore it is convenient to introduce a movement stop of any convenient form, such as the end face 20 of groove 19, placed so as to prevent further sliding movement of each block parallel to its abutment face at a point when the head (X) if each block is out of engagement with the outer body grooves but the tail (Y) of each is still in engagement.

The direction of pull 21 from the operative position is approximately parallel with the travel 16 so far described. The line of pull is not however in line with the stop 20. Thus when further linear motion is inhibited by the stop, i.e. the angle between block faces 18 and 48 contacts the stop, the force is manifest as a rotating couple around the stop, and the net effect is that continued application of the force rotates the block about a centre roughly coincident with the stop. This movement swings the tail (Y) of the block out of engagement with the outer body, the movement in this area now being much more radial in sense. The rotational movement actually tends to swing the head end of the block back into engagement, but the location of the turning centre, and the clearance already gained at the head end, is sufficient to prevent actual reengagement from taking place.

Any point (Z) on the block near the tail end thus has a movement of "hockey stick" nature, with a straight section (Z1-Z2) followed by a shorter, curved section (Z2-Z3). This action is the natural result of a single applied force 21 as described, and does not involve complex guides or mechanisms.

On reversal of the actuation to give an expansion thrust, the above sequence is reversed. The tails of the blocks swing outwards to give a partial engagement followed by the linear movement into full engagement.

Any mechanism which can urge the blocks substantially along the angled thrust lines can be considered. The requirements are that the "hockey stick" movement should be permitted, and that each block can come to rest in full wedging engagement without preventing others from doing so.

Some form of "float" or spring effect is therefore required, but this should not minimise the withdrawal power necessary to pull blocks out of engagement after having been under heavy load for a long period, for example.

One mechanical possibility is an actuating ring lying above the circle of blocks, and engaging each with a spring link or sprung pin-and-slot assembly. Partial rotation of the ring about the door central axis would then carry all the blocks along the requisite paths.

A multi-armed spider, rotating on a central hub, could substitute for the actuating ring, with a block attached with some freedom to each arm. In such a case the arms themselves could be designed to flex to permit the necessary individual stopping points for the blocks.

It will be appreciated that many alternative forms of block actuation are possible.

In the preferred form, however, the actuation is hydraulic, with a small cylinder 50 actuating each block. This inherently provides the requisites of equal force on all blocks, with independence of stopping point, and the small actuators can be easily arranged to work on the preferred thrust lines and to accept compound movements. In a preferred form a hand pump and small reservoir will be used, mounted on the door itself, with a simple valve control to the cylinders 50 for expansion or contraction of the ring of blocks. It is easy to envisage power-operated systems and/or remote controls for this function in more complex applications.

The sealing system, designated generally 23, is made between the door and a suitable corresponding surface within the outer body. It is so located that it is inboard of the locking block assembly so that the latter is never within the pressurised envelope and is viewable at all times.

The desirable criteria for the seal system are as follows:
  i. It should be capable of being positively unseated from its seal position when under modest pressure by external means which therefore cause it to vent that pressure, without jeopardising its integrity when the unseating means are not activated. Note that this facility is restricted to a few bars pressure. It would not be safe, practicable or desirable to attempt such unseating at the high pressures for which the design is intended, but such an attempt, if made, should fail to succeed without ill effects.
  ii. It should seal by inherent elasticity and location at the very lowest positive pressures from within, immediately the door is locked.
  iii. It should be shaped so that the sealing force is enhanced as the pressure rises, and be capable of sealing at least up to 400 Bars.
  iv. It should not suffer extrusion and other permanent deformation during prolonged exposure to high pressure.
  v. It should be readily operable and immediately able to reclose.
  vi. It should be tolerant of the deflections and misalignments that will occur in practice.
  vii. It should be reasonably tolerant of dirt and abuse as a practical pipeline component.

The seal configuration 23 adopted is an annulus of U-cross-section, moulded in an elastomeric material of any suitable composition. An outwardly flared lip 24 at the bottom of the U-section co-operates in piston seal fashion with a mating cylindrical bore 25 in the outer body. An inwardly flared lip 26 at the top of the U-section co-operates in face seal fashion with a mating flat face 27 on the inside of the door. The U-section cavity within the seal rubber is filled with a rigid annular member or seal hoop 28, which is a snug fit therein. The exposed end face 29 of the hoop, which may conveniently be of steel, is located approximately level with, but just within the plane of the inner lip 26.

The seal remains within the outer body and is restrained from outward movement by a retaining ring 30 assembled within a corresponding recess 31 in the outer body. This ring 30 may be sectioned or otherwise arranged for practical assembly. It is convenient for this retaining ring also to secure the upper outer edge 32 of the elastic U-section seal 23 which may be formed with a suitable lip or other relating surface.

The door 38, on closure, moves into the outer body 1 axially, i.e., not on a simple hinge. Various sliding or pivotted support mechanisms can be considered for this movement. As the door moves inwards it contacts firstly the lip 26 of the elastic face seal, which is appropriately deflected, and then the end face 29 of the steel hoop 28, which is slightly pushed inwards with the door. This movement is resisted by the axial elasticity of the outer limb 33 of the U-section seal 23, the sliding lip 24 of which maintains its permanent seal contact with the bore 25.

More or less simultaneously with the contact with the seal assembly, a second surface 34 on the door makes contact with the outer surface of the seal retaining ring 30. This too is able to deflect with the door impact as its inwards axial restraint is provided by the elastic material of the seal anchorage 32.

In a practical door, there must be a radial clearance 35 between the fixed and moving parts, of a generous nature, say one or two millimeters.

At high pressures it is not practicable to bridge this gap with an elastic material, which must extrude. It will be seen that in this design the critical gap is located on the end face 29 of the seal hoop 28, which is a rigid material, in a resilient mounting. Under internal hydrostatic pressure, this face is strongly pressed against the door and against the seal restraint ring 30, which under these conditions also presses against and moves with the door. There is thus no clearance whatever on the plane (W) by which the soft elastomer under intense hydraulic pressure can extrude into the door clearances 35 and furthermore all the seal pressure loads are transmitted metal-to-metal.

It will be seen that the seal can accept an inward closing impact by a limited amount of axial travel, and conversely can "follow" the door outwards as the latter, and its restraint system, take up clearances and deflect under load. This is the purpose of a clearance 36. It will also be apparent that the face 29 of the seal support hoop 28 is on the unpressurised side of the seal system, i.e., although under load it is not "wet". It is therefore accessible to mechanisms for unseating the seal; in short, any axial thrust against it, of sufficient magnitude, will force it off its abutting face on the door against the internal pressure and against the resilience of the outer limb 33 of the U-section. This movement pulls the face seal lip 26 away from the door and so causes a uniformly distributed "leak" around the entire periphery.

The strength of the seal support hoop is such that axial thrust at a few points will achieve this.

A number of thrust bars 37 are positioned in grooves or channels around the periphery of the door, lying axially so that their inner ends 39 are shaped to rest against the face 29 of the seal support hoop, and their outer ends 40 to extend through the door thickness to the vicinity of the locking blocks 8, more particularly the location between adjacent blocks. There may be one thrust bar 37 for each locking block interspace, or some fewer number with a minimum of three.

The outer ends 40 of the thrust bars 37 are shaped to co-operate with supplementary surfaces formed on the ends of the blocks 8, so that the movements of the latter as already described are made to cause and control axial movements in the bars 37. Thus inclined planes formed on the blocks "head" (X) ends are arranged to force down the bars 37 as the blocks move in the linear part 16 of their travel. The seal is therefore unseated and any pressure is revealed while the tail of each block is still in engagement and the door is still safely locked.

The block and bar faces may be so arranged that only when the bars 37 have been depressed can the tails (Y) of the blocks 8 swing inwards, and can furthermore be arranged to ensure that the tails swing outwards before the blocks travel linearly to allow the seal to seat once again. This return movement of the seal due to inherent elasticity may be supplemented by springs acting on the bars 37. It will be understood that there are a number of ways in which those interlocking actions can be achieved, the important point being the interaction between the seal 23, via the thrust bars 37, and the locking blocks 8, to enforce and take advantage of the two-stage unlocking already described. The number of methods relates to the disposition of angled and interlocking ramps or contact surfaces on the blocks and bars; it is not necessary to involve further mechanisms to realise the desired safety principle.

It is possible that a powerful actuating mechanism could cause the blocks to pass through both stages of unlocking the door in such a fashion that the unseated seal would not vent pressure sufficiently rapidly to save the door from forcible opening, thus defeating the purpose of the two-stage process. In order to avoid this an operator control can be introduced on the door, enforcing his presence at the door before the first stage of unlocking can continue into the second stage. This would take the form of an inhibiting device for the second stage, controlling either the seal thrust bars 37, the blocks 8 or the actuating mechanism so that he could not be unaware of a blowing seal before proceeding finally to free the door.

In addition to this specific feature, any conventional vent-type bleeder screws could be incorporated, preventing any attempt at opening until a port or ports to the interior has been opened. There are clearly many locations at which such constructive interference could be applied.

What we claim is:

1. The combination of a closure member and a pressure member including a body having an aperture to be closed, said closure member comprising a door fitting in said aperture, a plurality of blocks slidably mounted adjacent the periphery of said door for movement from a withdrawn position at least substantially wholly within the periphery of said door to a position in which a part of each block protrudes beyond the periphery of said door for engagement with said body, said parts of said blocks together forming a protrusion extending substantially around the periphery of said door, and means for moving the blocks from the withdrawn position to the protruding position, and said aperture in part defining an annular groove receiving said parts of said blocks; and an annular seal having separately defined surfaces sealing to said door and to said body, said seal being sufficiently flexible to be moved out of contact with the door when acted upon by a force originating outside of said pressure member, and thrust bars being arranged to transmit force applied from outside of said pressure member to said seal.

2. A combination as defined in claim 1 wherein said thrust bars are carried by said door.

3. The combination of a pressure member including a body having an aperture to be closed and a closure member closing said aperture, said closure member including a door fitting in said aperture, a plurality of blocks each slidably mounted on said door adjacent the periphery of said door for movement from a withdrawn position at least substantially wholly within the periphery of said door to a position in which a part of each block protrudes beyond the periphery of said door in engagement with said body, said parts of said blocks in combination defining a protrusion extending substantially around the periphery of said door, guiding means carried by said door engaging said blocks and guiding said blocks for controlled compound generally circumferential and radial movement for selectively engaging and disengaging said body with said blocks having an intermediate position during the movement thereof providing for partial engagement of said blocks with said body, and actuator means coupled to said blocks for moving said blocks in unison.

4. The combination of claim 3 wherein surfaces on said blocks coact with surfaces on said thrust bars, and said thrust bars extend through the thickness of the door and into contact with said annular seal to move said seal out of sealing contact with said door during a portion of the movement of said blocks.

5. A combination as claimed in claim 3 wherein said body has an annular groove for reception of the said parts of said blocks, and an annular seal having separately defined surfaces for sealing to said door and said body, said seal being exposed to the exterior of said pressure member and being sufficiently flexible to be moved out of contact with said door when acted upon by a force originating outside of said pressure member.

6. A combination as claimed in claim 5 together with a rigid reinforcing member between said door and said annular seal.

7. A combination as claimed in claim 5 wherein said body has an annular recess located between said annular seal and said annular groove, and there is an annular seal-retaining ring located in said annular recess.

8. A combination as claimed in claim 5 wherein said annular seal is of U-shaped cross-section and defining a hollow part, and a rigid annular member filling said hollow part.

9. A combination as claimed in claim 5 wherein thrust bars are arranged to transmit force applied from outside of said pressure member to said seal.

10. A combination as claimed in claim 9 wherein the force is applied to said thrust bars by said blocks.

11. A combination as claimed in claim 10 wherein surfaces on said blocks coact with surfaces on said thrust bars, and said thrust bars extend through the thickness of the door and into contact with said annular seal to move said seal out of sealing contact with said door during a portion of the movement of said blocks.

12. A combination as claimed in claim 8 wherein said seal has a portion interlocked with said body retaining said seal relative to said body.

13. A combination as claimed in claim 12 together with a retainer ring carried by said body overlying a portion of said seal and a portion of said rigid annular member.

14. A combination as defined by claim 13 wherein said retainer ring partially underlies said door.

15. A combination as claimed in claim 3 wherein each block is of a configuration relative to said body wherein one end portion of each block first engages said body followed by an arcuate movement of each block during further movement thereof towards said body.

16. A combination as defined in claim 3 wherein said actuator means includes an actuator for each block, and each actuator is carried by an adjacent one of said building means.

17. The combination of a closure member and a pressure member including a body having an aperture to be closed, said closure member comprising a door fitting in said aperture, a plurality of blocks slidably mounted adjacent the periphery of said door for movement from a withdrawn position at least substantially wholly within the periphery of said door to a position in which a part of each block protrudes beyond the periphery of said door for engagement with said body, said parts of said blocks together forming a protrusion extending substantially around the periphery of said door, and means for moving the blocks from the withdrawn position to the protruding position, and said aperture in part defining an annular groove receiving said parts of said blocks; and an annular seal having separately defined surfaces sealing to said door and to said body, said seal being sufficiently flexible to be moved out of contact with the door when acted upon by a force originating outside of said pressure member, said seal having a portion interlocked with said body retaining said seal relative to said body.

18. The combination of a closure member and a pressure member including a body having an aperture to be closed, said closure member comprising a door fitting in said aperture, a plurality of blocks slidably mounted adjacent the periphery of said door for movement from a withdrawn position at least substantially wholly within the periphery of said door to a position in which a part of each block protrudes beyond the periphery of said door for engagement with said body, said parts of said blocks together forming a protrusion extending substantially around the periphery of said door, and means for moving the blocks from the withdrawn position to the protruding position, and said aperture in part defining an annular groove receiving said parts of said blocks; and an annular seal having separately defined surfaces sealing to said door and to said body, said seal being sufficiently flexible to be moved out of contact with the door when acted upon by a force originating outside of said pressure member; and a retainer ring carried by said body overlying a portion of said seal and a portion of said rigid annular member.

19. A combination as defined by claim 18 wherein said retainer ring partially underlies said door.

* * * * *